(12) United States Patent
Simonet et al.

(10) Patent No.: US 9,717,136 B2
(45) Date of Patent: Jul. 25, 2017

(54) STEERING WHEEL PROTECTED AGAINST ELECTRO-STATIC DISCHARGES

(71) Applicant: AUTOLIV DEVELOPMENT AB, Vargarda (SE)

(72) Inventors: Yann Simonet, Poitiers (FR); Olivier Degert, Exireuil (FR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 993 days.

(21) Appl. No.: 14/019,837

(22) Filed: Sep. 6, 2013

(65) Prior Publication Data

US 2015/0068346 A1    Mar. 12, 2015

(51) Int. Cl.
| | | |
|---|---|---|
| *G05G 1/10* | (2006.01) | |
| *B62D 1/04* | (2006.01) | |
| *H05F 3/02* | (2006.01) | |
| *B60R 16/06* | (2006.01) | |

(52) U.S. Cl.
CPC .............. *H05F 3/02* (2013.01); *B60R 16/06* (2013.01); *B62D 1/046* (2013.01); *Y10T 74/20256* (2015.01)

(58) Field of Classification Search
CPC .......... H05F 3/02; B60R 16/06; B62D 1/043; B62D 1/046; B62D 1/04
USPC ..................... 74/484 R, 491, 552; 200/305
See application file for complete search history.

(56) References Cited

U.S. PATENT DOCUMENTS

| | | | | |
|---|---|---|---|---|
| 2,614,155 | A * | 10/1952 | Lippy ....................... | H05F 3/02 16/DIG. 12 |
| 6,453,769 | B2 * | 9/2002 | Sakurai ................ | B60Q 1/0082 74/552 |
| 8,008,589 | B2 * | 8/2011 | Grundmeier ......... | B60Q 1/1469 200/305 |
| 9,308,930 | B2 | 4/2016 | Bostick et al. | |
| 2002/0046936 | A1 * | 4/2002 | Ibe ....................... | B60Q 1/0082 200/61.54 |
| 2004/0083849 | A1 * | 5/2004 | Umemura ......... | B60R 21/21658 74/552 |
| 2013/0263692 | A1 * | 10/2013 | Bostick .................. | B62D 1/046 74/558 |

OTHER PUBLICATIONS

Inventor's Description of a Switch Assembly Implemented in the Volkswagen Polo.

* cited by examiner

*Primary Examiner* — David M Fenstermacher
*Assistant Examiner* — Jake Cook
(74) *Attorney, Agent, or Firm* — Stephen T. Olson; Harness, Dickey & Pierce, P.L.C.

(57) ABSTRACT

A steering wheel for a vehicle may include a frame, a foam layer, a decorative member, a switch assembly and a contact element. The frame may include a central hub, a rim, and a spoke extending between the central hub and the rim. The foam layer may encase at least a portion of the frame. The decorative member may be mounted to the frame and may be at least partially formed of an electrically conductive material. The switch assembly may be mounted to the decorative member. The contact element may extend from the decorative member and may contact the frame to electrically connect the electrically conductive material of the decorative member with the frame.

20 Claims, 2 Drawing Sheets

STEERING WHEEL PROTECTED AGAINST ELECTRO-STATIC DISCHARGES

FIELD

The present disclosure relates to a steering wheel that is protected against electro-static discharges.

BACKGROUND

This section provides background information related to the present disclosure and is not necessarily prior art.

A vehicle typically includes a steering wheel that a driver can manipulate to steer the vehicle as desired. Many steering wheels include one or more switch assemblies for controlling one or more electrical accessory systems in the vehicle, such as a stereo, cruise control, and/or mobile communication systems, for example. Integrating these switch assemblies into the steering wheel allows the driver to control the accessory systems with minimal disruption to the safe operation of the vehicle.

SUMMARY

This section provides a general summary of the disclosure, and is not a comprehensive disclosure of its full scope or all of its features.

In one form, the present disclosure provides a steering wheel for a vehicle that may include a frame, a foam layer, a decorative member, a switch assembly and a contact element. The frame may include a central hub, a rim, and a spoke extending between the central hub and the rim. The foam layer may encase at least a portion of the frame. The decorative member may be mounted to the frame and may be at least partially formed of an electrically conductive material. The switch assembly may be mounted to the decorative member. The contact element may extend from the decorative member and may contact the frame to electrically connect the electrically conductive material of the decorative member with the frame.

In some embodiments, the contact element may extend through an opening in the foam layer.

In some embodiments, the foam layer may encase the spoke.

In some embodiments, the contact element may directly contact the frame.

In some embodiments, the contact element may include a central portion and first and second legs extending from opposing ends of the central portion.

In some embodiments, the central portion may be attached to and may directly contact the decorative member.

In some embodiments, the first and second legs may extend through first and second openings, respectively, in the foam layer.

In some embodiments, the central portion may engage the decorative member by a snap fit.

In some embodiments, the first and second legs may be resiliently flexible.

In some embodiments, the contact element may be spaced apart from the switch assembly.

In some embodiments, the contact element may contact the spoke and the switch assembly may be mounted on another spoke.

In some embodiments, the contact element may be configured to transmit an electro-static discharge from the decorative member to the frame.

In some embodiments, the decorative member may be formed from a metallized plastic.

In some embodiments, the contact element may be integrally formed with the decorative member.

In another form, the present disclosure provides a steering wheel that may include a frame, a decorative member, a foam layer, a switch assembly and a contact element. The frame may include a central hub, a rim, and a plurality of spokes extending between the central hub and the rim. The decorative member may be mounted to the spokes and may be at least partially formed of an electrically conductive material. The foam layer may encase the spokes and may be disposed between the decorative member and the spokes. The switch assembly may be mounted to the decorative member. The contact element may be attached to the decorative member and may extend through an opening in the foam layer to contact the frame and transmit an electro-static discharge from the electrically conductive material of the decorative member to the frame.

In some embodiments, the contact element may include a central portion and first and second legs extending from opposing ends of the central portion.

In some embodiments, the central portion may be attached to and may directly contact the decorative member.

In some embodiments, the first leg may extend through the opening in the foam layer and the second leg may extend through another opening in the foam layer.

In some embodiments, the first and second legs may be resiliently flexible.

In some embodiments, the contact element may be spaced apart from the switch assembly.

In some embodiments, the contact element may contact a first one of the plurality of spokes and the switch assembly may be mounted on a second one of the plurality of spokes.

In some embodiments, the decorative member may be formed from a metallized plastic.

In some embodiments, the contact element may be integrally formed with the decorative member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
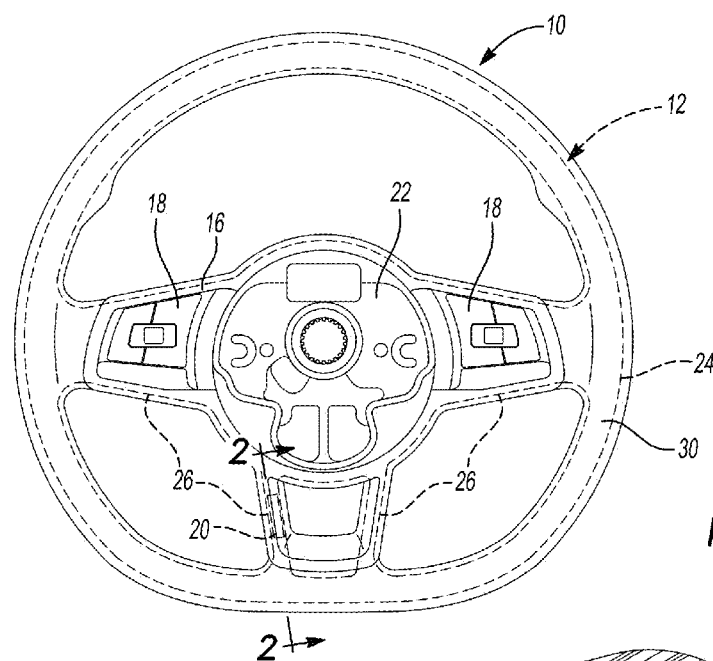
FIG. 1 is a plan view of a steering wheel having a decorative trim member and a contact element according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-4, a steering wheel 10 is provided and may include a frame 12, a foam layer 14, a decorative trim member 16, one or more switch assemblies 18, and a contact element 20. The steering wheel 10 may be incorporated into a vehicle (not shown) such as an automobile, a watercraft, or an aircraft, for example, or any other type of vehicle. The steering wheel 10 may be operatively coupled to a steering mechanism (not shown) of the vehicle, which may be operable to steer the vehicle.

As shown in FIG. 1, the frame 12 may include a central hub 22, an outer rim 24, and a plurality of spokes 26 extending between the central hub 22 and the outer rim 24. The outer rim 24 surrounds the central hub 22 and the spokes 26 and generally defines a perimeter of the steering wheel 10. The central hub 22, outer rim 24, and the spokes 26 may be die cast or otherwise formed from a metallic material, for example, and/or any other suitable structural material.

Figure 2:
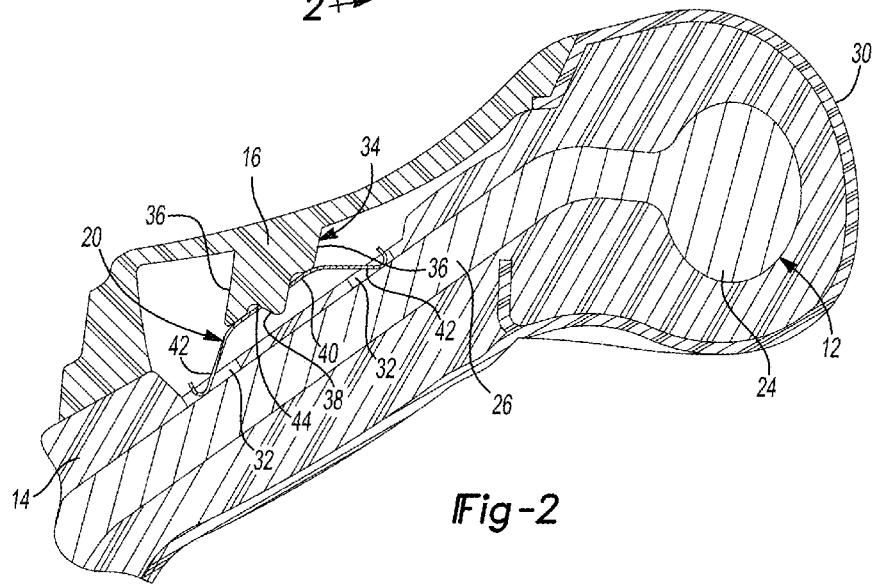
FIG. 2 is a partial cross-sectional view of the steering wheel of FIG. 1.
Figure 4:
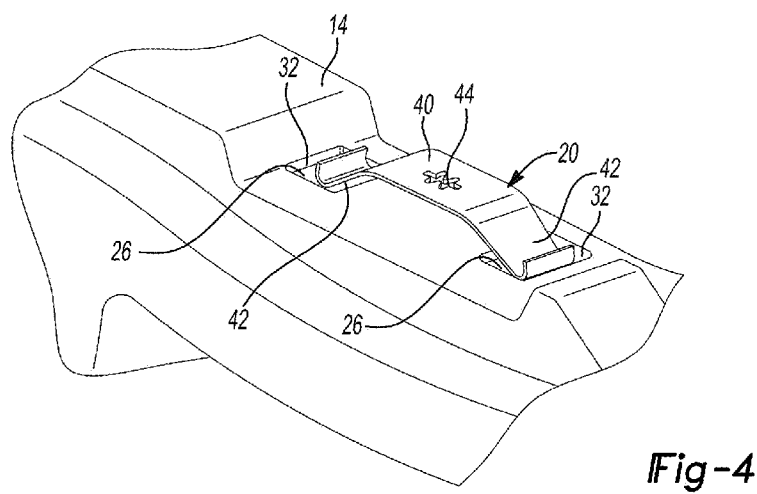
FIG. 4 is a perspective view of the contact element contacting a frame of the steering wheel.

The foam layer 14 may encase the spokes 26, the outer rim 24 and/or the central hub 22. The foam layer 14 may be formed from any suitable one or more polymeric materials. As shown in FIGS. 2 and 4, the foam layer 14 may include a pair of apertures or openings 32 through which the contact element 20 may extend to contact one of the spokes 26. The openings 32 may be formed as voids in the foam layer 14 during injection or molding of the foam layer 14 over the frame 12. Alternatively, the openings 32 could be formed by removing foam material from the foam layer 14 as a separate operation after the foam layer 14 is injected or molded over the frame 12. In some embodiments, a sheet 30 of leather or vinyl, for example, may be wrapped around a portion of the foam layer 14 covering the outer rim 24 and/or the spokes 26.

The decorative trim member 16 may be mounted to and may at least partially cover the central hub 22 and/or one or more of the spokes 26. As shown in FIG. 1, the switch assemblies 18 may be mounted to and/or within the decorative trim member 16. In some embodiments, one or more switch assemblies 18 may be mounted to and/or within another trim component (not shown) and/or one or more switch assemblies 18 may be mounted directly to the frame 12 or any other suitable component. The switch assemblies 18 may include buttons to control an electronic device. The electronic device may be selected from a group consisting of a stereo, a communication system, an entertainment system, an information system, an electronic transmission shifting system, a cruise-control system, and any other electronic devices.

Figure 3:
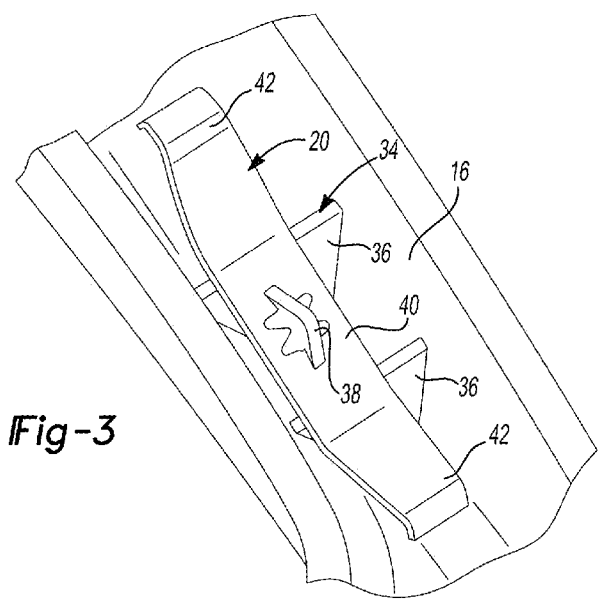
FIG. 3 is a perspective view of the decorative trim member and the contact element.

As shown in FIG. 2, the foam layer 14 may be disposed between the spokes 26 and the decorative trim member 16. The decorative trim member 16 may be formed from a metallized polymeric material or a polymeric material coated or plated with a metallic material, for example. In some embodiments, the decorative trim member 16 could be formed from any other suitable material, such as a polymer-metal composite material, a solid metallic material or a solid polymeric material, for example. As shown in FIGS. 2 and 3, the decorative trim member 16 may include an integrally formed mounting feature 34 that engages the contact element 20. The mounting feature 34 may include a pair of rails 36 and a barbed protrusion 38 disposed therebetween.

The contact element 20 may be formed from a metallic material. In the embodiment illustrated, the contact element 20 may include a body 40 and a pair of legs 42. The body 40 may contact the rails 36 and/or other portions of the decorative trim member 16. The body 40 may include an aperture 44 through which the barbed protrusion 38 of the mounting feature 34 may be received for a snap fit therebetween. It will be appreciated that the contact element 20 could be secured to the decorative trim member 16 by any suitable means, such as one or more fasteners, for example, or the contact element 20 could be integrally formed with the decorative trim member 16. The legs 42 may extend from opposite ends of the body 40 and may be resiliently flexible relative to the body 40.

As shown in FIGS. 2 and 4, each of the legs 42 may extend through the openings 32 in the foam layer 14 and may contact the spoke 26. In this manner, the contact element 20 may electrically connect the decorative trim member 16 with the frame 12 to facilitate the flow of electrical current from the decorative trim member 16 to the frame 12 through the contact element 20. For example, the contact element 20 may conduct electrical current from an electrostatic discharge from the decorative trim member 16 to the frame 12. The frame 12 may be electrically grounded to the chassis of the vehicle, for example. In this manner, damage to the switch assemblies 18 due to electrostatic discharge can be reduced or prevented.

The legs 42 may be resiliently flexed or compressed when the decorative trim member 16 is installed on the steering wheel 10. The resulting biasing force of the legs 42 against the spoke 26 may ensure that electrical contact is maintained between the contact element 20 and the spoke 26 despite dimensional variations of the decorative trim member 16, the contact element 20 and/or the spoke 26 due to manufacturing tolerances and/or expansion or contraction of materials due to temperature changes, for example. While the contact element 20 is described above as having a pair of legs 42, in some embodiments, the contact element 20 may include only one leg or more than two legs. In some embodiments, only one leg or more than two legs may contacts the frame 12.

While FIG. 1 depicts the contact element 20 contacting a first one of the spokes 26 and the switch assemblies 18 are shown mounted to second and third ones of the spokes 26, in some embodiments, the contact element 20 could be mounted to the same spoke 26 as one of the switch assemblies 18.

While the contact element 20 is described above as contacting one of the spokes 26, in some embodiments, the contact element 20 could be positioned to contact the central hub 22 or the outer rim 24. Furthermore, it will be appreciated that the steering wheel 10 could include multiple contact elements 20 contacting the decorative trim member 16 and the frame 12 in multiple locations to conduct electrical energy between the decorative trim member 16 and the frame 12. In any of the embodiments described above and/or shown in the figures, the contact between the contact element 20 and the decorative trim member 16 and/or the contact between the contact element and the frame 12 may be direct or indirect contact.

In operation, the contact element 20 may electrically ground the decorative trim member 16. That is, the contact element 20 may electrically connect the decorative trim member 16 with the frame 12, which may be grounded to the chassis of the vehicle, as described above. In this manner, an electrostatic discharge that is conducted through the decorative trim member 16 can be conducted to the ground through the contact element 20 and frame 12, and damage to the switch assemblies 18 due to the electrostatic discharge can be reduced or prevented.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A steering wheel comprising:
   a frame including a central hub, a rim, and a spoke extending between the central hub and the rim;
   a foam layer encasing at least a portion of the frame;
   a decorative member mounted to the frame and at least partially formed of an electrically conductive material;
   a switch assembly mounted to the decorative member; and
   a contact element extending from the decorative member and contacting the frame to electrically connect the electrically conductive material of the decorative member with the frame.

2. The steering wheel of claim 1, wherein the contact element extends through an opening in the foam layer.

3. The steering wheel of claim 2, wherein the foam layer encases the spoke.

4. The steering wheel of claim 1, wherein the contact element directly contacts the frame.

5. The steering wheel of claim 1, wherein the contact element includes a central portion and first and second legs extending from opposing ends of the central portion.

6. The steering wheel of claim 5, wherein the central portion is attached to and directly contacts the decorative member.

7. The steering wheel of claim 6, wherein the first and second legs extend through first and second openings, respectively, in the foam layer.

8. The steering wheel of claim 6, wherein the central portion engages the decorative member by a snap fit.

9. The steering wheel of claim 5, wherein the first and second legs are resiliently flexible.

10. The steering wheel of claim 1, wherein the contact element contacts the spoke and the switch assembly is mounted to another spoke.

11. The steering wheel of claim 1, wherein the contact element is configured to transmit an electro-static discharge from the decorative member to the frame.

12. The steering wheel of claim 1, wherein the decorative member is formed from a metallized plastic.

13. The steering wheel of claim 1, wherein the contact element is integrally formed with the decorative member.

14. A steering wheel comprising:
   a frame including a central hub, a rim, and a plurality of spokes extending between the central hub and the rim;
   a decorative member mounted to the spokes and at least partially formed of an electrically conductive material;
   a foam layer encasing the spokes and disposed between the decorative member and the spokes;
   a switch assembly mounted to the decorative member; and
   a contact element attached to the decorative member and extending through an opening in the foam layer to contact the frame and transmit an electro-static discharge from the electrically conductive material of the decorative member to the frame.

15. The steering wheel of claim 14, wherein the contact element includes a central portion and first and second legs extending from opposing ends of the central portion.

16. The steering wheel of claim 15, wherein the central portion is attached to and directly contacts the decorative member.

17. The steering wheel of claim 16, wherein the first leg extends through the opening in the foam layer and the second leg extends through another opening in the foam layer.

18. The steering wheel of claim 17, wherein the first and second legs are resiliently flexible.

19. The steering wheel of claim 18, wherein the contact element contacts a first one of the plurality of spokes and the switch assembly is mounted to a second one of the plurality of spokes.

20. The steering wheel of claim 19, wherein the decorative member is formed from a metallized plastic.

\* \* \* \* \*